(12) United States Patent
Hu

(10) Patent No.: US 11,126,035 B1
(45) Date of Patent: Sep. 21, 2021

(54) BACKLIGHT MODULE AND LIQUID CRYSTAL DISPLAY DEVICE

(71) Applicant: HUIZHOU CHINA STAR OPTOELECTRONICS TECHNOLOGY CO., LTD., Huizhou (CN)

(72) Inventor: Qianshuang Hu, Huizhou (CN)

( * ) Notice: Subject to any disclaimer, the term of this patent is extended or adjusted under 35 U.S.C. 154(b) by 195 days.

(21) Appl. No.: 16/618,410

(22) PCT Filed: Nov. 5, 2019

(86) PCT No.: PCT/CN2019/115589
§ 371 (c)(1),
(2) Date: Dec. 2, 2019

(87) PCT Pub. No.: WO2021/012463
PCT Pub. Date: Jan. 28, 2021

(30) Foreign Application Priority Data

Jul. 23, 2019 (CN) .......................... 201910665321.6

(51) Int. Cl.
*G02F 1/13357* (2006.01)
*G02F 1/1335* (2006.01)

(52) U.S. Cl.
CPC .. *G02F 1/133608* (2013.01); *G02F 1/133628* (2021.01)

(58) Field of Classification Search
CPC ...................... G02F 1/133608; G02F 1/133628
See application file for complete search history.

(56) References Cited

U.S. PATENT DOCUMENTS

| 8,944,664 | B2 * | 2/2015 | Kim | G09F 13/04 |
| | | | | 362/623 |
| 9,239,482 | B2 * | 1/2016 | Li | G02B 6/0083 |
| 10,605,981 | B2 * | 3/2020 | Huang | G02B 6/0091 |
| 2013/0182412 | A1 * | 7/2013 | Choi | G02F 1/133615 |
| | | | | 362/97.1 |
| 2015/0098247 | A1 * | 4/2015 | Shin | G02B 6/009 |
| | | | | 362/611 |
| 2015/0260908 | A1 * | 9/2015 | Kiguchi | G02F 1/1336 |
| | | | | 349/58 |
| 2016/0245975 | A1 * | 8/2016 | Li | G02B 6/0023 |
| 2016/0327830 | A1 | 11/2016 | Zhang | |

FOREIGN PATENT DOCUMENTS

| CN | 101105602 A | 1/2008 | |
| CN | 201707459 U | 1/2011 | |
| CN | 102628566 A * | 8/2012 | .......... G02B 6/0085 |
| CN | 202975959 U | 6/2013 | |
| CN | 103792712 A | 5/2014 | |
| CN | 105549263 A | 5/2016 | |
| CN | 109979333 A | 7/2019 | |
| KR | 20120021052 A | 3/2012 | |
| KR | 20190013279 A | 2/2019 | |
| WO | WO-2015018193 A1 * | 2/2015 | .......... G02F 1/1368 |

* cited by examiner

Primary Examiner — Mary Ellen Bowman

(57) ABSTRACT

A backlight module and a liquid crystal display device are provided. The heat in the heat-accumulation region of the liquid crystal display panel is diffused into periphery of the heat sink in the chamber through the plurality of first through holes by using air as a medium, and the heat sink dissipates heat. Therefore, temperature in the heat-accumulation region of the liquid crystal display panel is lowered, and avoids the problem that service life of the liquid crystal display device becomes short due to high local temperature of the heat-accumulation region.

17 Claims, 3 Drawing Sheets

BACKLIGHT MODULE AND LIQUID CRYSTAL DISPLAY DEVICE

FIELD OF INVENTION

The present application relates to the field of display technologies, and in particular to a backlight module and a liquid crystal display device.

BACKGROUND OF INVENTION

Currently, when a chip-on-film is bonded to a liquid crystal display panel to input electrical signals to the liquid crystal display panel, peripheral traces, configured to connect a gate on array (GOA) gate driving circuit and the chip-on-film, are passed through a corner of the liquid crystal display panel from a region where the GOA gate driving circuit is disposed extend to a region where the chip-on-film is bonded, so that the chip-on-film outputs corresponding control signals to the GOA gate driving circuit. Due to limited space at the corner of the liquid crystal display panel, especially for high-resolution products such as 8K, the limited space may cause heat accumulated by the peripheral traces to be difficult to be eliminated when the liquid crystal display panel is lit. This results temperature at the corresponding corner of a side of the chip-on-film bonded to the liquid crystal display panel can be as high as 70° C. Temperature of partial liquid crystal display panel is too high, which may result in a decrease in service life of the liquid crystal display panel, and may even cause short circuiting of the peripheral traces.

Therefore, it is necessary to propose a technical solution to solve the problem that the peripheral trace extends to the chip-on-film passing through a corner where temperature is higher and lowers service life of the liquid crystal display panel.

Technical Problem

The purpose of the present application is to provide a backlight module and a liquid crystal display device. The backlight module reduces temperature of at least one heat-accumulation region of the liquid crystal display panel, thereby preventing the liquid crystal display panel from being shortened service life due to high local temperature in the heat-accumulation region.

SUMMARY OF INVENTION

Technical Solution

To achieve the aforementioned purpose, the present application provides a backlight module, the backlight module including a backplate, a plastic frame, and a heat sink, wherein the plastic frame includes a frame-shaped support portion, the frame-shaped support portion is fixed on the backplate and encloses a chamber with the backplate, at least part of the frame-shaped support portion is provided with a plurality of first through holes and the plurality of first through holes penetrate the frame-shaped support portion along a thickness direction of the frame-shaped support portion, wherein the heat sink is accommodated in the chamber, fixed on the backplate and arranged corresponding to the plurality of first through holes, wherein the frame-shaped support portion further includes a groove, the groove is disposed corresponding to the plurality of first through holes, and the plurality of first through holes are connected to the groove.

In the aforementioned backlight module, the backlight module further including a heat conductive portion, wherein the heat conductive portion is fixed on the frame-shaped support portion and/or the heat sink and passes through the plurality of first through holes to extend from the frame-shaped support portion to the heat sink.

In the aforementioned backlight module, the heat conductive portion includes a plurality of heat conducting wires, the heat conducting wires pass through the first through holes to extend from the frame-shaped support portion to the heat sink.

In the aforementioned backlight module, the heat conductive portion is made of at least one selected from a group consisting of gold, silver, copper, aluminum, graphene, graphite, and carbon fiber.

In the aforementioned backlight module, the backlight module further including a light guide plate and an optical film which are accommodated in the chamber, wherein the optical film is disposed between the light guide plate and the frame-shaped support portion, and the optical film is provided with a plurality of second through holes arranged corresponding to the plurality of first through holes, wherein the light guide plate is provided with a plurality of third through holes arranged corresponding to the plurality of second through holes, the first through holes are in one-to-one correspondence with the second through holes, and the second through holes are in one-to-one correspondence with the third through holes.

A backlight module, including a backplate, a plastic frame, and a heat sink, wherein the plastic frame includes a frame-shaped support portion, the frame-shaped support portion is fixed on the backplate and encloses a chamber with the backplate, at least part of the frame-shaped support portion is provided with a plurality of first through holes and the plurality of first through holes penetrate the frame-shaped support portion along a thickness direction of the frame-shaped support portion, wherein the heat sink is accommodated in the chamber, fixed on the backplate and arranged corresponding to the plurality of first through holes.

In the aforementioned backlight module, the backlight module further including a heat conductive portion, wherein the heat conductive portion is fixed on the frame-shaped support portion and/or the heat sink and passes through the plurality of first through holes to extend from the frame-shaped support portion to the heat sink.

In the aforementioned backlight module, the heat conductive portion includes a plurality of heat conducting wires, the heat conducting wires pass through the first through holes to extend from the frame-shaped support portion to the heat sink.

In the aforementioned backlight module, the heat conductive portion is made of at least one selected from a group consisting of gold, silver, copper, aluminum, graphene, graphite, and carbon fiber.

In the aforementioned backlight module, the backlight module further including a light guide plate and an optical film which are accommodated in the chamber, wherein the optical film is disposed between the light guide plate and the frame-shaped support portion, and the optical film is provided with a plurality of second through holes arranged corresponding to the plurality of first through holes, wherein the light guide plate is provided with a plurality of third through holes arranged corresponding to the plurality of second through holes, the first through holes are in one-to-one correspondence with the second through holes, and the second through holes are in one-to-one correspondence with the third through holes are one-to-one disposed.

A liquid crystal display device, including a liquid crystal display panel and a backlight module, wherein the backlight module includes a backplate, a plastic frame, and a heat sink, wherein the plastic frame includes a frame-shaped support portion, the frame-shaped support portion is fixed on the backplate and encloses a chamber with the backplate, wherein the liquid crystal display panel is fixed on the frame-shaped support portion, and the liquid crystal display panel has at least one heat accumulation region, wherein the frame-shaped support portion is provided with a plurality of first through holes corresponding to a position of the heat accumulation region of the liquid crystal display panel, and the plurality of first through holes penetrate the frame-shaped support portion along a thickness direction of the frame-shaped support portion, wherein the heat sink is accommodated in the chamber and fixed on the backplate corresponding to the plurality of first through holes.

In the aforementioned liquid crystal display device, the liquid crystal display device further including a heat conductive portion, wherein the heat conductive portion is fixed on the frame-shaped support portion and/or the heat sink and passes through the plurality of first through holes to extend from the frame-shaped support portion to the heat sink.

In the aforementioned liquid crystal display device, the heat conductive portion includes a plurality of heat conducting wires, the heat conducting wires pass through the first through holes to extend from the frame-shaped support portion to the heat sink.

In the aforementioned liquid crystal display device, the heat conductive portion is made of at least one selected from a group consisting of gold, silver, copper, aluminum, graphene, graphite, and carbon fiber.

In the aforementioned liquid crystal display device, the liquid crystal display device further including a light guide plate and an optical film which are accommodated in the chamber, wherein the optical film is disposed between the light guide plate and the frame-shaped support portion, and the optical film is provided with a plurality of second through holes arranged corresponding to the plurality of first through holes, wherein the light guide plate is provided with a plurality of third through holes arranged corresponding to the plurality of second through holes, the first through holes are in one-to-one correspondence with the second through holes, and the second through holes are in one-to-one correspondence with the third through holes are one-to-one disposed.

In the aforementioned liquid crystal display device, the heat accumulation region of the liquid crystal display panel includes a first non-display region and a second non-display region adjacent to the first non-display region, wherein the liquid crystal display panel further includes a chip on film and a peripheral trace, the chip on film is disposed in the first non-display region, and the peripheral trace extends from the second non-display region to the first non-display to connected with the chip on film electrically.

In the aforementioned liquid crystal display device, the frame-shaped support portion further includes a groove, the groove is disposed corresponding to the heat accumulation region of the liquid crystal display panel, and the plurality of first through holes are connected to the groove.

Beneficial Effect

The present invention provides a backlight module and a liquid crystal display device. The heat in the heat-accumulation region of the liquid crystal display panel is diffused into the heat sink in the chamber through the plurality of first through holes by using air as a medium, and the heat sink dissipates heat. Therefore, temperature of the heat-accumulation region of the liquid crystal display panel is lowered, and the problem that service life of the liquid crystal display device becomes short due to high local temperature of the heat-accumulation region is avoided.

Figure 1:
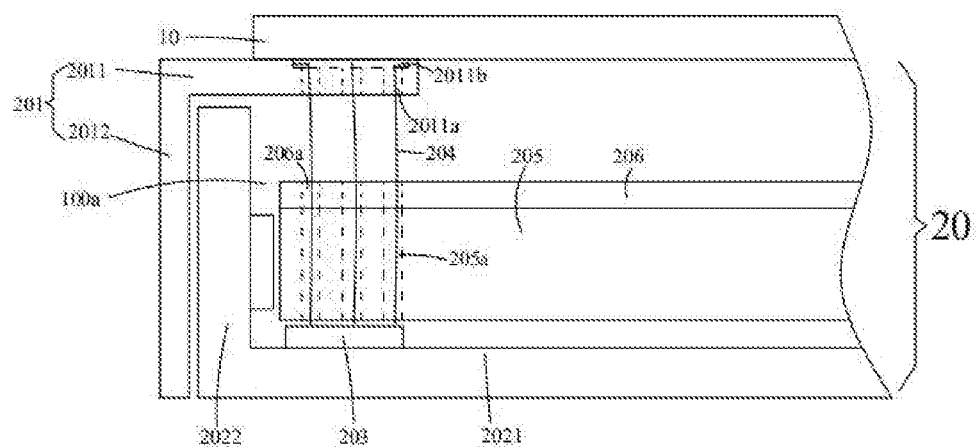
FIG. 1 is a schematic structural view of a liquid crystal display device according to an embodiment of the present application.

The reference numerals are as follows:

100 liquid crystal display device; 10 liquid crystal display panel; 20 backlight module; 201 plastic frame; 203 heat sink; 204 thermal conductive portion; 205 light guide plate; 206 optical film; 101 heat-accumulation region; 102 peripheral trace; 103 chip-on-film; 104 GOA gate driving circuit; 101a first non-display region; 101b second non-display region; 2021 bottom plate; 2022 first side wall; 201 plastic frame; 2011 frame-shaped support portion; 2012 second side wall; 100a chamber; 2011a first through hole; 2011b groove; 2011c first corner; 2011d first heat dissipative region; 2011e second heat dissipative region; 205a third through hole; 206a second through hole.

DETAILED DESCRIPTION OF EMBODIMENTS

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

Please refer to FIG. 1, which is a schematic structural view of a liquid crystal display device according to an embodiment of the present application. The liquid crystal display device 100 includes a liquid crystal display panel 10 and a backlight module 20. The liquid crystal display panel 10 can be a in-plane switch liquid crystal display panel, a vertical-alignment liquid crystal display panel, or a twisted nematic liquid crystal display panel. The backlight module 20 can be a direct backlight module or a side-edge backlight module. In this embodiment, the backlight module is a side-edge backlight module. The backlight module 20 includes a backplate, a plastic frame 201, a light guide plate 205, a heat sink 203, an optical film 206, and the like.

The liquid crystal display panel 10 is for displaying an image. The liquid crystal display panel 10 includes an array substrate, a color filter substrate, and a liquid crystal layer between the array substrate and the color filter substrate. The liquid crystal display panel 10 is controlled to display an image by controlling liquid crystal deflection in the liquid crystal layer.

Figure 2:
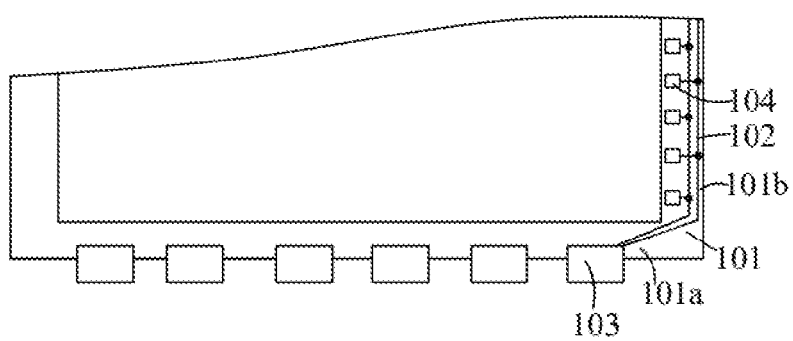
FIG. 2 is a plane view of a liquid crystal display panel of the liquid crystal display device shown in FIG. 1.

Please refer to FIG. 2, which is a schematic plane view of a liquid crystal display panel. The liquid crystal display panel 10 has at least one heat-accumulation region 101. The heat-accumulation region 101 is positioned in corner of the liquid crystal display panel where temperature is higher than room temperature. Specifically, the liquid crystal display panel 10 includes a chip-on-film 103, a peripheral trace 102, and a GOA gate driving circuit 104. When the liquid crystal display panel 10 is driven unilaterally by the GOA gate driving circuit 104, the liquid crystal display panel 10 has a heat-accumulation region 101. When the liquid crystal display panel 10 is bilaterally driven by the GOA gate driving circuit 104, the liquid crystal display panel 10 has two heat-accumulation regions 101, and the two heat-accumulation regions 101 are positioned at two adjacent corners of the liquid crystal display panel 10. The heat-accumulation region 101 includes a first non-display region 101a and a second non-display region 101b adjacent to the first non-display region 101a. The chip-on-film 103 is disposed on the first non-display region 101a, and the peripheral trace 102 extends from the second non-display region 101b to the first non-display region 101a to be electrically connected to the chip-on-film 103. It can be understood that the liquid crystal display panel 10 can also have the heat-accumulation region 101 for other reasons.

The backplate includes a bottom plate 2021 and a first side wall 2022, and the first side wall 2022 is disposed surround the bottom plate 2021. The preparation material of the backplate can be aluminum, alloy or plastic.

The plastic frame 201 includes a frame-shaped support portion 2011 and a second side wall 2012, and the second side wall 2012 is disposed around the frame-shaped support portion 2011. The frame-shaped support portion 2011 is fixed on the first side wall 2022, that is, the frame-shaped support portion 2011 is fixed on the backplate and encloses a chamber 100a with the backplate. The first side wall 2022 and the second side wall 2012 are opposite disposed in parallel. The liquid crystal display panel 10 is fixed to the frame-shaped support portion 2011. The frame-shaped support portion 2011 is provided with a plurality of first through holes 2011a corresponding to a position of the heat-accumulation region 101 of the liquid crystal display panel 10, and the plurality of first through holes 2011a penetrate the frame-shaped support portion 2011 along a thickness direction of the frame-shaped support portion 2011.

Figure 3A:
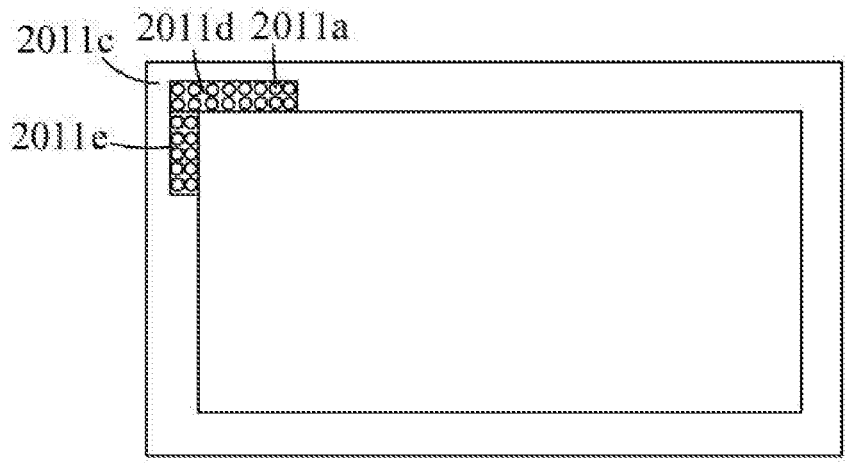
FIG. 3A is a plane view of a first type of a frame-shaped support portion of the liquid crystal display device shown in FIG. 1.
Figure 3B:
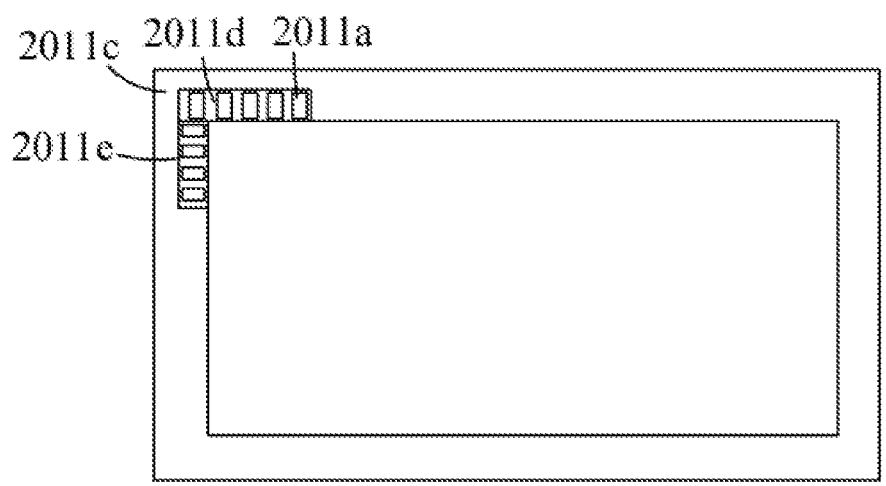
FIG. 3B is a plane view of a second type of the frame-shaped support portion of the liquid crystal display device shown in FIG. 1.
Figure 3C:
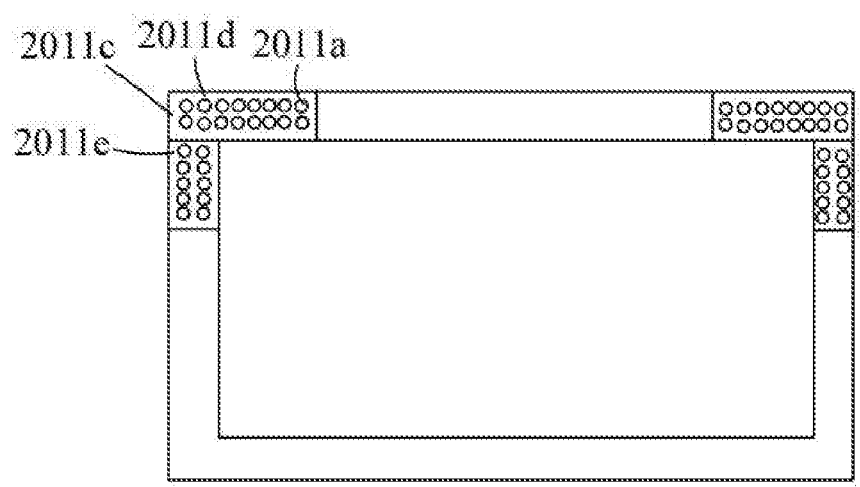
FIG. 3C is a plane view of a third type of the frame-shaped support portion of the liquid crystal display device shown in FIG. 1.

Specifically, as shown in FIG. 3a, it is a schematic plane view of a first type of the frame-shaped support portion of the liquid crystal display device shown in FIG. 1. The cross-sectional shape of each of the first through holes 2011a can be circular. As shown in FIG. 3b, it is a plane view of a second type of the frame-shaped support portion of the liquid crystal display device shown in FIG. The cross-sectional shape of each of the first through holes 2011a can also be a rectangle. As shown in FIG. 3c, it is a plane view of a third type of the frame-shaped support portion of the liquid crystal display device. The plurality of first through holes 2011a are disposed at two corners adjacent to the frame-shaped support portion 2011.

As shown in FIG. 3a, the frame-shaped support portion 2011 has a first corner 2011c, and the first corner 2011c corresponds to the heat-accumulation region 101 of the liquid crystal display panel 10, that is, a corner of the frame-shaped support portion 2011 corresponding to the first corner 2011c is positioned below a corner of the plastic frame 201 corresponding to the heat-accumulation region 101. The first corner 2011c is L-shaped, and the first corner 2011c has a first heat dissipative region 2011d and a second heat dissipative region 2011e, and the first heat dissipative region 2011d is adjacent to and perpendicular to the second heat dissipative region 2011e. The plurality of first through holes 2011a are respectively disposed in the first heat dissipative region 2011d and the second heat dissipative region 2011e. The first heat dissipative region 2011d is positioned on a side of the plastic frame 201 corresponding to the first non-display region 101a on a side of the liquid crystal display panel 10. The second heat dissipative region 2011e is positioned on a side of the plastic frame 201 corresponding to the second non-display region 101b on a side of the liquid crystal display panel 10. An area ratio of the first through holes 2011a in the first heat dissipative region 2011d to the first heat dissipative region 2011d (that is, a ratio of a sum of cross-sectional areas of the plurality of first through holes 2011a in the first heat dissipative region 2011d to an area of the first heat dissipative region 2011d) is greater than an area ratio of the first through hole 2011a in the second heat dissipative region 2011e to the second heat dissipative region 2011e, so that the heat in the first non-display region 101a of the liquid crystal display panel 10 is diffused faster. In order to accommodate the peripheral trace 102 being narrowed in the first non-display area 101a, which arrangement is closer and results in a higher temperature of the first non-display area 101a.

A length of the first heat dissipative region 2011d in width direction of the plastic frame 201 is less than or equal to a width of the plastic frame 201. A length of the second heat dissipative region 2011e in width direction of the plastic frame 201 is less than or equal to the width of the plastic frame 201. Specifically, the lengths of the first heat dissipative region 2011d and the second heat dissipative region 2011e in width direction of the plastic frame 201 are equal to the width of the plastic frame 201, to make the number of the first through holes 2011a disposed in the first corner 2011c more. It is more advantageous that the heat in the heat-accumulation region 101 of the liquid crystal display panel is diffused to the heat sink 203 through the first through hole 2011a.

The heat sink 203 is accommodated in the chamber 100a and is fixed to the backplate corresponding to the plurality of first through holes 2011a. Specifically, the heat sink 203 is fixed on the bottom plate 2021 at a corner of the backplate, and the corner of the backplate is positioned under the heat-accumulation region 101 of the liquid crystal display panel 10. The heat sink 203 can be a thermal dissipative component commonly used in a backlight module, and is not specifically limited in this application.

The heat in the heat-accumulation region 101 of the liquid crystal display panel 10 is diffused into periphery of the heat sink 203 in the chamber 100a through the plurality of first through holes 2011a by using air as a medium, and the heat sink 203 dissipates the heat. Therefore, temperature of the heat-accumulation region 101 of the liquid crystal display panel 10 is lowered, and the problem that service life of the liquid crystal display device becomes short due to high local temperature of the heat-accumulation region 101 is avoided.

The backlight module 20 further includes a thermal conductive portion 204 fixed on the frame-shaped support portion 2011 and/or the heat sink 203 and passing through the plurality of first through holes 2011a to extend from the frame-shaped support portion 2011 to the heat sink 203. A fabricating material of the thermal conductive portion 204 is selected from gold, silver, copper, aluminum, graphene, graphite, and carbon fiber. The thermal conductive portion 204 is further configured to conduct heat in the heat-accumulation region 101 to the heat sink 203 to further improve cooling rate and cooling effect of the heat-accumulation region 101 of the liquid crystal display panel 10. That is, heat is transferred to the heat sink 203 using air and the thermal conductive portion as mediums to cool the temperature of the heat-accumulation region 101 of the liquid crystal display panel 10, thereby preventing the liquid crystal display device from being shortened service life due to high local temperature of the liquid crystal display panel being excessively high.

Specifically, the thermal conductive portion 204 includes a plurality of thermal conductive wires that pass through the first through holes 2011a to extend from the frame-shaped support portion 2011 to the heat sink 203. The thermal conductive wire is a copper wire. The thermal conductive wires are fixed to a surface of the frame-shaped support portion 2011 near the liquid crystal display panel. The thermal conductive wires can be fixed on the frame-shaped support portion 2011 by bonding or welding. It can be understood that the thermal conductive wires can also be fixed on the heat sink 203 and extend through the plurality of first through holes 2011a to the frame-shaped support portion 2011 to reach the heat-accumulation region 101 of the liquid crystal display panel 10.

As shown in FIG. 1, the frame-shaped support portion 2011 further includes a groove 2011b disposed corresponding to the heat-accumulation region 101 of the liquid crystal display panel 10, and the plurality of first through holes 2011a are connected to the groove 2011b. The thermal conductive portion 204 is fixed on an inner wall of the groove 2011b. On the one hand, the groove 2011b allows the heat in the heat-accumulation region 101 of the liquid crystal display panel 10 to diffuse into the chamber 100a more quickly. On the other hand, the groove 2011b can also be used for accommodating the thermal conductive portion 204 to prevent the thermal conductive portion 204 from causing unevenness when the liquid crystal display panel 10 is disposed on the frame-shaped support portion 2011.

The backlight module 10 also includes a light source. The light guide plate 205 and the optical film 206 are accommodated in the chamber 100a, and the optical film 206 is disposed between the light guide plate 205 and the frame-shaped support portion 2011. The plurality of thermal conductive wires can utilize a gap in the chamber to extend from the frame-type support portion 2011 to the heat sink 203.

Further, the optical film 206 is provided with a plurality of second through holes 206a corresponding to the plurality of first through holes 2011a, and the light guide plate 205 is provided with a plurality of third through hole 205a corresponding to the plurality of second through holes 206a. The first through holes 2011a and the second through holes 206a, the second through holes 206a and the third through holes 205a are one-to-one disposed. On the one hand, the heat diffused into the chamber 100a has more ways to reach the heat sink 203, so that temperature of the heat-accumulation region 101 is cooled faster. The optical film 206 is disposed above the light guide plate 205. The second through holes 206a are connected to the third through holes 205a to reduce a path of heat dissipate to the heat sink 203 with air as a medium, further increasing the rate of heat dissipation.

The thermal conductive portion 204 can also sequentially pass through the first through holes 2011a, the second through holes 206a, and the third through holes 205a to extend from the frame-shaped support portion 2011 to the heat sink 203 to increase the paths of heat dissipation and further improve cooling rate of the heat-accumulation region 101.

The embodiment of the present application further provides a backlight module. The backlight module includes a backplate, a plastic frame, and a heat sink. The plastic frame includes a frame-shaped support portion, the frame-shaped support portion is fixed on the backplate and encloses a chamber with the backplate. At least part of the frame-shaped support portion is provided with a plurality of first through holes and the plurality of first through holes penetrate the frame-shaped support portion along a thickness direction of the frame-shaped support portion, the heat sink is accommodated in the chamber and fixed on the backplate corresponding to the plurality of first through holes.

The present invention provides a plurality of first through holes in a partial region of the frame-shaped support portion of the plastic frame, so that the heat in partial heat-accumulation region of the liquid crystal display panel fixed on the frame-shaped support portion is diffused into periphery of the heat sink in the chamber through the plurality of first through holes 2011a by using air as a medium, and the heat sink dissipates the heat. Thereby temperature of the heat-accumulation region of the liquid crystal display panel is lowered, which prevents service life of the liquid crystal display panel from becoming short.

Further, the backlight module further includes a thermal conductive portion fixed on the frame-shaped support portion and/or the heat sink and passing through the plurality of first through holes to extend from the frame-shaped support portion to the heat sink. The thermal conductive portion is made of at least one selected from a group consisting of gold, silver, copper, aluminum, graphene, graphite, and carbon fiber. Specifically, the thermal conductive portion includes a plurality of thermal conductive wires that pass through the first through holes to extend from the frame-shaped support portion to the heat sink.

The backlight module further includes a light guide plate and an optical film. The light guide plate and the optical film are accommodated in the chamber, and the optical film is disposed between the light guide plate and the frame-shaped support portion. The optical film is provided with a plurality of second through holes corresponding to the plurality of first through holes. The light guide plate is provided with a plurality of third through holes corresponding to the plurality of second through holes. The first through holes and the second through holes, the second through holes and the third through holes are one-to-one disposed.

Further, the frame-shaped support portion further includes a groove, the groove is disposed corresponding to the plurality of first through holes, and the plurality of first through holes are connected to the groove.

The description of the above embodiments is only for helping to understand the technical solution of the present application and its core ideas. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight module, comprising:
   a backplate, a plastic frame, and a heat sink,
   wherein the plastic frame comprises a frame-shaped support portion, the frame-shaped support portion is fixed on the backplate and encloses a chamber with the backplate, at least part of the frame-shaped support portion is provided with a plurality of first through holes and the plurality of first through holes penetrate the frame-shaped support portion along a thickness direction of the frame-shaped support portion, wherein the heat sink is accommodated in the chamber, fixed on the backplate and arranged corresponding to the plurality of first through holes, and wherein the frame-shaped support portion further comprises a groove, the groove is disposed corresponding to the plurality of first through holes, and the plurality of first through holes are connected to the groove.

2. The backlight module of claim 1, further comprising a heat conductive portion, wherein the heat conductive portion is fixed on the frame-shaped support portion and/or the heat sink and passes through the plurality of first through holes to extend from the frame-shaped support portion to the heat sink.

3. The backlight module of claim 2, wherein the heat conductive portion comprises a plurality of heat conducting wires, the heat conducting wires pass through the first through holes to extend from the frame-shaped support portion to the heat sink.

4. The backlight module of claim 2, wherein the heat conductive portion is made of at least one selected from a group consisting of gold, silver, copper, aluminum, graphene, graphite, and carbon fiber.

5. The backlight module of claim 1, further comprising a light guide plate and an optical film which are accommodated in the chamber, wherein the optical film is disposed between the light guide plate and the frame-shaped support portion, and the optical film is provided with a plurality of second through holes arranged corresponding to the plurality of first through holes, wherein the light guide plate is provided with a plurality of third through holes arranged corresponding to the plurality of second through holes, the first through holes are in one-to-one correspondence with the second through holes, and the second through holes are in one-to-one correspondence with the third through holes.

6. A backlight module, comprising:
a backplate, a plastic frame, and a heat sink,
wherein the plastic frame comprises a frame-shaped support portion, the frame-shaped support portion is fixed on the backplate and encloses a chamber with the backplate, at least part of the frame-shaped support portion is provided with a plurality of first through holes and the plurality of first through holes penetrate the frame-shaped support portion along a thickness direction of the frame-shaped support portion,
wherein the heat sink is accommodated in the chamber, fixed on the backplate and arranged corresponding to the plurality of first through holes.

7. The backlight module of claim 6, further comprising a heat conductive portion, wherein the heat conductive portion is fixed on the frame-shaped support portion and/or the heat sink and passes through the plurality of first through holes to extend from the frame-shaped support portion to the heat sink.

8. The backlight module of claim 7, wherein the heat conductive portion comprises a plurality of heat conducting wires, the heat conducting wires pass through the first through holes to extend from the frame-shaped support portion to the heat sink.

9. The backlight module of claim 7, wherein the heat conductive portion is made of at least one selected from a group consisting of gold, silver, copper, aluminum, graphene, graphite, and carbon fiber.

10. The backlight module of claim 6, further comprising a light guide plate and an optical film which are accommodated in the chamber, wherein the optical film is disposed between the light guide plate and the frame-shaped support portion, and the optical film is provided with a plurality of second through holes arranged corresponding to the plurality of first through holes, wherein the light guide plate is provided with a plurality of third through holes arranged corresponding to the plurality of second through holes, the first through holes are in one-to-one correspondence with the second through holes, and the second through holes are in one-to-one correspondence with the third through holes are one-to-one disposed.

11. A liquid crystal display device, comprising:
a liquid crystal display panel and a backlight module,
wherein the backlight module comprises a backplate, a plastic frame, and a heat sink,
wherein the plastic frame comprises a frame-shaped support portion, the frame-shaped support portion is fixed on the backplate and encloses a chamber with the backplate,
wherein the liquid crystal display panel is fixed on the frame-shaped support portion, and the liquid crystal display panel has at least one heat accumulation region,
wherein the frame-shaped support portion is provided with a plurality of first through holes corresponding to a position of the heat accumulation region of the liquid crystal display panel, and the plurality of first through holes penetrate the frame-shaped support portion along a thickness direction of the frame-shaped support portion,
wherein the heat sink is accommodated in the chamber and fixed on the backplate corresponding to the plurality of first through holes.

12. The liquid crystal display device of claim 11, further comprising a heat conductive portion, wherein the heat conductive portion is fixed on the frame-shaped support portion and/or the heat sink and passes through the plurality of first through holes to extend from the frame-shaped support portion to the heat sink.

13. The liquid crystal display device of claim 12, wherein the heat conductive portion comprises a plurality of heat conducting wires, the heat conducting wires pass through the first through holes to extend from the frame-shaped support portion to the heat sink.

14. The liquid crystal display device according to claim 12, wherein the heat conductive portion is made of at least one selected from a group consisting of gold, silver, copper, aluminum, graphene, graphite, and carbon fiber.

15. The liquid crystal display device of claim 11, further comprising a light guide plate and an optical film which are accommodated in the chamber, wherein the optical film is disposed between the light guide plate and the frame-shaped support portion, and the optical film is provided with a plurality of second through holes arranged corresponding to the plurality of first through holes, wherein the light guide plate is provided with a plurality of third through holes arranged corresponding to the plurality of second through holes, the first through holes are in one-to-one correspondence with the second through holes, and the second through holes are in one-to-one correspondence with the third through holes are one-to-one disposed.

16. The liquid crystal display device of claim 11, wherein the heat accumulation region of the liquid crystal display panel comprises a first non-display region and a second non-display region adjacent to the first non-display region, wherein the liquid crystal display panel further comprises a chip on film and a peripheral trace, the chip on film is disposed in the first non-display region, and the peripheral trace extends from the second non-display region to the first non-display to connected with the chip on film electrically.

17. The liquid crystal display device of claim 11, wherein the frame-shaped support portion further comprises a groove, the groove is disposed corresponding to the heat accumulation region of the liquid crystal display panel, and the plurality of first through holes are connected to the groove.

* * * * *